Sept. 27, 1949.  L. A. PAINE ET AL  2,482,793
CONNECTING MECHANISM FOR DEMAND METERS
Filed Oct. 26, 1946
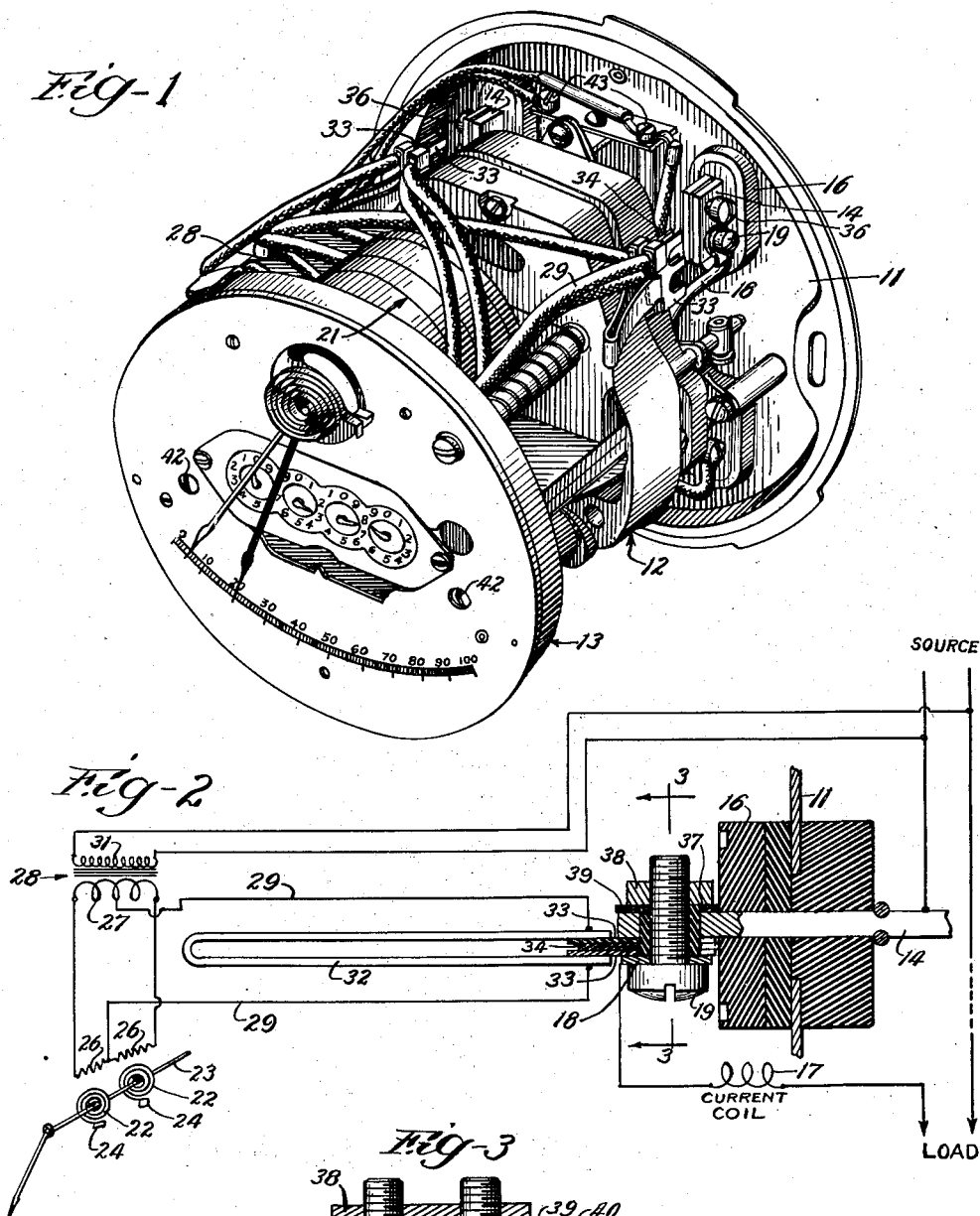

Patented Sept. 27, 1949

2,482,793

UNITED STATES PATENT OFFICE 2,482,793

CONNECTING MECHANISM FOR DEMAND METERS

Louis Arthur Paine and Kenneth Melvin Smith, West Lafayette, Ind., assignors to Duncan Electric Manufacturing Company, La Fayette, Ind., a corporation of Illinois Application October 26, 1946, Serial No. 705,946

6 Claims. (Cl. 171—34)

In metering the supply of electricity, it is very desirable to have the various larger units of a meter easily separated from one another and interchangeable with other like units. In the case of watthour meters, this has previously been fairly well accomplished. According to the present invention, this is now also accomplished with respect to a thermal demand attachment for a watthour meter.

In the case of the thermal demand attachment, the problem is made relatively complicated by virtue of the relatively large number of connections which must be made and by virtue of the desire that variations in the resistance of these connections have no effect on the calibration of the demand meter, thus permitting calibration of the demand unit independently of its application to a particular meter. With regard to the number of connections required, it is not only necessary to provide a voltage connection for which purpose two connections suffice, but it is also necessary to connect both the heaters of the thermal unit, and sometimes a shunt in parallel with each of them, in the circuit. For each connection of this latter type, series connections are required to be interposed in a circuit of the watthour meter. It is highly desirable to use a standard meter case as far as possible and particularly to obtain a compactness which will not require an enlarged base. Furthermore, it is very desirable that the watthour meter be easily restored to operability when the demand attachment has been removed. According to the present invention, the series connections are accomplished in a very simple manner through the aid of two terminal plates in parallel relationship, separated by an insulated spacer and slotted to slip onto terminal screws, a shunt (when used) and the other necessary connections being permanently connected to these two terminal plates. The same screw may tighten the connection for both of these terminal plates, the screw itself engaging one of the terminal plates and exerting a force through it and the insulating spacer to clamp the other terminal plate against a connecting member. Of course, the screw must be insulated from this connecting member. Tightening the screw when the terminal plates are not inserted thereunder makes the watthour meter effective without the demand meter.

Additional objects and advantages of the invention will be apparent from the following description and from the drawings in which:

Figure 1 is a perspective view of a meter embodying the present invention with the connection to which the invention is particularly directed slightly separated;

Fig. 2 is a fragmentary, cross-sectional view on an enlarged scale showing the details of the connection and showing a typical circuit diagrammatically; and Fig. 3 is a cross-section taken approximately on the line 3—3 of Fig. 2.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In the illustrated form of the invention, the combination meter is carried by a base plate 11 which is illustrated as a conventional plate of the socket type of meter, the plate, with the meter carried thereby, being adapted to be plugged into a meter socket. The base carries a watthour meter assembly 12. A demand meter assembly 13 is preferably carried by the watthour meter assembly 12 so that the two may be removed from the base plate 11 as a unit if desired.

The base plate 11 carries four terminal blades 14 which are insulated from the base plate by insulators 16. These terminal blades project from the front of the base seen in Fig. 1 through the base to form blades with which the meter is plugged into the socket. The terminal blades 14 are, therefore, connectors for connecting the meter elements to the wires of the circuit being metered.

The watthour meter includes at least one current coil indicated diagrammatically at 17 in Fig. 2. A typical connection for such current coil 17 includes a lead wire or conductor 18 provided with a terminal through which screw 19 extends for clamping the terminal of conductor 18 against conductor or blade 14. This is a common method of connecting the current coil 17 to connectors or terminal blades 14 when there is no demand meter involved. In that instance the screw 19 is usually threaded directly to the terminal blade 14.

According to the present invention, it is desirable that this same connection be made when a demand meter is not attached to the watthour meter, but that the connection be readily altered when desired, to connect a part of the demand meter circuit in series between the terminal blade 14 and the conductor 18. This may very readily be accomplished by the structure shown in the drawings.

The illustrated form of demand meter is of the thermal type including a thermal meter element 21. As illustrated diagrammatically in Fig. 2, this thermal meter element has within it a pair of oppositely wound bimetallic coils 22, each connected at one end to the indicator shaft 23 and to a fixed member 24 at the other end. The thermal unit 21 also includes heaters 26. The heaters 26 are heated by the combined effects of current from the secondary coil 27 of transformer 28 and current from in the circuit being measured which is carried through lead wires 29.

The theory underlying the thermal demand meter is not a part of the present invention and is well known. It may be noted, however, that the secondary coil 27 is responsive to the voltage in the metered circuit being energized by primary coil 31 connected across the circuit being measured. The current in the circuit being measured which is supplied to the thermal unit by leads 29 is divided between the two heaters 26. When the expected current in the circuit being measured is heavier than it would be desired to carry through the heaters 26, any predetermined portion of the current may be shunted past these heaters by a shunt 32. It is essential that there be an exactly constant relationship between the resistance of the path of the shunt 32 and the path of resistances 26. Accordingly, the leads 29 are soldered or otherwise permanently connected to the shunt terminals 33.

As seen in Figs. 1 and 2, the shunt 32 may conveniently be a slim U-shaped strap of metal so that the terminals 33 will lie close together and parallel to one another. They may then easily be separated and insulated from one another by an insulator 34. Both the terminals 33 and the insulator 34 are slotted so that they may jointly be slipped under the heads of screw 19, and preferably also a second screw 36. When the screw 19 is tightened, it clamps the various conductors and insulators as a pile so that, as seen in Fig. 2, the terminal blade 14 is in contact with one demand meter terminal 33 while the other demand meter terminal 33 is in contact with the terminal of conductor 18.

In order that there be no short circuiting, it is necessary that screw 19 be adequately insulated. To this end it is connected with an insulating bushing 37 which extends through all of the pile except, perhaps, the terminal of conductor 18. The screw 19 is threaded into a knot or plate 38 which is insulated from terminal blade 14 by an insulator 39.

It will be apparent from Fig. 2 that when the terminals 33 and the separating insulator 34 are withdrawn from the screw 19, the screw 19 may then be screwed in further to clamp the terminal of conductor 18 directly against the terminal blade 14. This will connect the current coil 17 in the circuit independently of the demand meter when the demand meter is not desired.

Inasmuch as permanency of connection is important between the shunt 32 and the lead wires 29, the form of connection illustrated is preferred. As seen in Figs. 1 and 3, each of the terminals 33, which are preferably formed of fairly heavy copper, are provided with an extension bent back to form a soldering loop 41. The various lead wires to be connected through these terminals are soldered in these loops 41 where they are held reliably by the combined effects of the soldering and the loop. The terminals 33 are soldered directly to the shunt 32. It is preferable that this soldering be made first and be made with a silver solder or other high-temperature solder so that this connection will not be affected in soldering the lead wires in loops 41 with ordinary solder having a relatively low melting point.

Although the connections have been described with respect to one shunt 32 and its associated parts, it should be understood that there would ordinarily be two such shunts, the terminals 33 therefor being seen in Fig. 1, at the left of the watthour meter assembly 12. By loosening all four of the screws 19 and 36 and by loosening the supporting screws 42 for the thermal meter assembly, the entire thermal meter assembly including face plate 13 may be lifted off of the frame 12 of the watthour meter assembly. There may also be voltage connections which will need to be disconnected by loosening screws 43. After removing the thermal meter assembly, the various screws may be tightened again whereupon the watthour meter will be in a fully functioning condition.

It will be apparent that watthour meters may be sold and installed without the thermal demand unit and that subsequently the thermal demand meter features may be attached thereto by a reverse of the simple manner of disconnecting it just described. It may be necessary to substitute a slightly deeper glass cover when adding the thermal demand meter features, but otherwise no change in the support or housing will be required. It may be noted that 40 is a conductor strap forming part of the voltage connections for the meter. It and insulator 39 have been omitted in Fig. 1 for clarity.

From the foregoing it is seen that a combination of watthour and demand meters is provided in which the watthour meter may easily be rendered effective with or without the demand meter and in which the demand meter may easily be removed from or applied to or replaced on the watthour meter, the entire structure being supported by a conventional meter base plate. It may be noted in this connection that even if the bottom-connected type of meter base is used, it is preferred that it be provided with connectors at the position of the connectors 14, seen in the upper portion of Fig. 1, so that the same thermal demand meter may be applied thereto or removed therefrom at will.

We claim:

1. A combination of a watthour meter and a thermal demand meter incorporating a shunt member and a demand meter circuit permanently connected across the shunt member as a parallel unit, said combination including a connector for connection to a wire of the circuit being measured, a watthour meter lead wire, and means for interposing said parallel unit in series between said watthour meter lead and said connector, said means being adapted for ready separation from the connector and watthour meter lead while maintaining the demand meter circuit connected across the shunt, said structure including a pair of substantially parallel terminal plates to which the shunt and the demand meter circuit are connected, an insulating spacer between said plates, and screw means for jointly clamping together the watthour meter lead in contact with one terminal plate, the insulating spacer, and the other terminal plate in contact with the connector, said screw means being insulated between its ends and under one end so that in clamping said parts together it does not connect the terminal plates to each other or the watthour meter lead and connector to each other.

2. A combination of a watthour meter and a thermal demand meter incorporating a shunt member and a demand meter circuit permanently connected across the shunt member, said combination including a connector for connection to a wire of the circuit being measured, a watthour meter lead wire, and means for interposing the demand meter circuit in series between said watthour meter lead and said connector, said means being adapted for ready separation from the connector and watthour meter lead while maintaining the demand meter circuit connected across the shunt, said structure including a pair of substantially parallel terminal plates to which the demand meter circuit is connected, an insulating spacer between said plates, and screw means for jointly clamping together the watthour meter lead in contact with one terminal plate, the insulating spacer, and the other terminal plate in contact with the connector, said screw means being insulated between its ends and under one end so that in clamping said parts together it does not connect the terminal plates to each other or the watthour meter lead and connector to each other.

3. A combination of a watthour meter and a demand meter including a connector for connection to a wire of the metered circuit, a watthour meter lead conductor, a pair of demand meter circuit terminals separated by an insulator and lying between the connector and the lead conductor, a screw passing through the conductor, the terminals, and the connector for clamping them together as a pile, said terminals and the insulator therebetween being slotted with the slots correlated and opening on one edge so that they may be removed together, and said screw then being adapted to clamp the conductor and the connector together to effectuate the watthour meter circuit.

4. A combination of a watthour meter and a demand meter including a connector for connection to a wire of the circuit being measured, a watthour meter lead conductor, a pair of demand meter circuit terminals separated by an insulator and lying between the connector and the lead conductor, screw means for clamping together the conductor, the terminals, and the connector as a pile, said terminals being constructed and adapted to be removed together with the insulator therebetween, and said conductor and connector then being relatively movable one toward the other, and said screw means being constructed and adapted to clamp the conductor and the connector together to effectuate the watthour meter circuit.

5. A connecting mechanism including a connector for connection to a wire of the circuit being measured, a lead conductor, a pair of circuit terminals separated by an insulator and lying between the connector and the lead conductor, screw means for clamping together the conductor, the terminals, and the connector as a pile, said terminals being constructed and adapted to be removed together with the insulator therebetween, and said conductor and connector then being relatively movable one toward the other, and said screw means being constructed and adapted to clamp the conductor and the connector together to effectuate the remaining circuit.

6. A connecting mechanism including a connector for connection to a wire of the circuit being measured, a lead conductor, a pair of circuit terminals disposed in parallel relationship and lying between the connector and the lead conductor, insulating means separating the circuit terminals, screw means extending through the connector, the terminals and the lead conductor for clamping together the conductor, the terminals and the connector as a pile and for clamping together in contact with one another the conductor and the connector when the terminals and the insulating means therebetween are removed, said terminals and said insulating means as an assembly being provided with a slot extending thereinto from one edge of a dimension to encompass said screw means, and said terminals and insulating means being removable from the screw means and from between the connector and conductor while the screw means is maintained passing through the connector and conductor.

LOUIS ARTHUR PAINE.
KENNETH MELVIN SMITH.

REFERENCES CITED

The following references are of record in the file of this patent:

UNITED STATES PATENTS

| Number | Name | Date |
| --- | --- | --- |
| 2,337,212 | Thomson et al. | Dec. 21, 1943 |
| 2,391,479 | Rivers | Dec. 25, 1945 |